US012103547B2

(12) United States Patent
Salter et al.

(10) Patent No.: US 12,103,547 B2
(45) Date of Patent: Oct. 1, 2024

(54) VEHICLE HAVING USER INPUTS CONTROLLED BASED ON MONITORED PET LOCATION

(71) Applicant: Ford Global Technologies, LLC, Dearborn, MI (US)

(72) Inventors: Stuart C. Salter, White Lake, MI (US); Hussein H. Berry, Dearborn, MI (US); Annette Lynn Huebner, Highland, MI (US); Marguerite Lynn Kimball, Brighton, MI (US); David Brian Glickman, Southfield, MI (US); Gregory Paul Thomas, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 478 days.

(21) Appl. No.: 17/307,211

(22) Filed: May 4, 2021

(65) Prior Publication Data
US 2022/0355813 A1    Nov. 10, 2022

(51) Int. Cl.
*B60W 50/12*    (2012.01)
*B60K 35/10*    (2024.01)
(Continued)

(52) U.S. Cl.
CPC ............. *B60W 50/12* (2013.01); *B60K 35/10* (2024.01); *G06K 7/10366* (2013.01); *G06T 7/70* (2017.01);
(Continued)

(58) Field of Classification Search
CPC .................................................... B60W 50/12
See application file for complete search history.

(56) References Cited

U.S. PATENT DOCUMENTS

| 5,724,920 A | 3/1998 | Meisman et al. |
| 7,527,017 B1 | 5/2009 | Cribb |

(Continued)

FOREIGN PATENT DOCUMENTS

| CN | 109839929 A | 6/2019 | |
| DE | 102018129777 A1 * | 5/2019 | ........... A01K 11/008 |
| JP | 2006219009 A | 8/2006 | |

OTHER PUBLICATIONS

Hoffman, Connor, Here's How Dog Mode Works on the Tesla Model 3, Car and driver, (https://www.caranddriver.com/news/a29591859/how-tesla-dog-mode-works-model-3/)(Oct. 25, 2019) which is prior to the effective filing date of May 4, 2021. (Year: 2021).*

(Continued)

*Primary Examiner* — Jean Paul Cass
(74) *Attorney, Agent, or Firm* — Vichit Chea; Price Heneveld LLP

(57) ABSTRACT

A vehicle comprises user inputs, a monitoring system for detecting and monitoring a pet within the vehicle, and a controller processing signals generated by the monitoring system and determining a location of the pet based on the monitored signals. The controller controls activation of the user input controls based on the determined location of the pet to disable an operating mode of one or more of the user inputs when the pet is detected proximate to the user inputs.

19 Claims, 4 Drawing Sheets

(51) Int. Cl.
  *B60K 35/65* (2024.01)
  *G06K 7/10* (2006.01)
  *G06T 7/70* (2017.01)
  *G06V 20/59* (2022.01)
  *G06V 40/10* (2022.01)

(52) U.S. Cl.
  CPC .............. *G06V 20/59* (2022.01); *G06V 40/10* (2022.01); *B60K 35/65* (2024.01); *B60K 2360/1438* (2024.01); *B60K 2360/741* (2024.01); *B60W 2420/403* (2013.01); *B60W 2540/043* (2020.02); *G06T 2207/30268* (2013.01)

(56) References Cited

U.S. PATENT DOCUMENTS

| | | | |
|---|---|---|---|
| 7,600,486 | B2 | 10/2009 | Ellis |
| 8,100,084 | B1 | 1/2012 | Abramson |
| 8,117,991 | B1 | 2/2012 | Civitillo |
| 8,146,534 | B1 | 4/2012 | Robertson |
| 8,258,932 | B2 | 9/2012 | Wahlstrom |
| 8,768,292 | B2 | 7/2014 | Welch |
| 8,841,997 | B2 * | 9/2014 | Silveira .................... B60N 2/28 340/539.23 |
| 9,227,484 | B1 | 1/2016 | Justice et al. |
| 9,392,770 | B2 | 7/2016 | Almeida |
| 9,463,805 | B2 | 10/2016 | Kirsch et al. |
| 9,637,085 | B2 | 5/2017 | Sanchez Huipio et al. |
| 9,654,103 | B2 | 5/2017 | Buttolo et al. |
| 9,845,050 | B1 | 12/2017 | Garza et al. |
| 9,975,481 | B2 | 5/2018 | Hatton et al. |
| 10,091,972 | B1 | 10/2018 | Jensen et al. |
| 10,115,029 | B1 | 10/2018 | Day et al. |
| 10,303,961 | B1 | 5/2019 | Stoffel et al. |
| 10,352,759 | B1 | 7/2019 | Jensen |
| 10,649,061 | B2 | 5/2020 | Bjorkengren |
| 10,742,969 | B1 | 8/2020 | Rohatgi et al. |
| 10,785,604 | B1 | 9/2020 | Kumar et al. |
| 11,067,452 | B1 | 7/2021 | Lee et al. |
| 11,562,550 | B1 | 1/2023 | Asghar et al. |
| 2002/0169583 | A1 | 11/2002 | Gutta et al. |
| 2007/0131177 | A1 | 6/2007 | Perkitny |
| 2008/0246318 | A1 | 10/2008 | Bothe et al. |
| 2010/0305816 | A1 | 12/2010 | Orlewski |
| 2013/0106598 | A1 * | 5/2013 | Silveira .................. B60N 2/002 340/457 |
| 2014/0309806 | A1 | 10/2014 | Ricci |
| 2014/0309862 | A1 | 10/2014 | Ricci |
| 2014/0310739 | A1 | 10/2014 | Ricci et al. |
| 2014/0319895 | A1 | 10/2014 | Lange-Mao et al. |
| 2015/0342143 | A1 | 12/2015 | Stewart |
| 2016/0070527 | A1 | 3/2016 | Ricci |
| 2016/0227732 | A1 | 8/2016 | Pompey |
| 2016/0272112 | A1 * | 9/2016 | DeGrazia .................. B60Q 9/00 |
| 2016/0357262 | A1 | 12/2016 | Ansari |
| 2018/0142446 | A1 * | 5/2018 | Silber .................... F15B 13/044 |
| 2018/0194194 | A1 | 7/2018 | Lyubich et al. |
| 2019/0016235 | A1 | 1/2019 | Parida et al. |
| 2019/0118603 | A1 | 4/2019 | Feit |
| 2019/0225237 | A1 * | 7/2019 | Ishikawa .............. B60W 50/082 |
| 2019/0279447 | A1 | 9/2019 | Ricci |
| 2019/0389352 | A1 | 12/2019 | Koller et al. |
| 2020/0085004 | A1 | 3/2020 | Yoo et al. |
| 2020/0130702 | A1 | 4/2020 | Ferreira et al. |
| 2020/0307483 | A1 | 10/2020 | Topf et al. |
| 2020/0383580 | A1 | 12/2020 | Shouldice et al. |
| 2021/0232642 | A1 | 7/2021 | Ricci |
| 2022/0112760 | A1 | 4/2022 | Demele et al. |
| 2022/0242452 | A1 * | 8/2022 | Oboril ............... B60W 60/0016 |
| 2023/0106673 | A1 | 4/2023 | Asghar et al. |
| 2023/0230121 | A1 | 7/2023 | Chintakindi et al. |

OTHER PUBLICATIONS

Lim, Sohee, et al., Detection and Localization of People Inside Vehicle Using Impulse Radio Ultra-Wideband Radar Sensor, IEEE Sensors Journal, vol. 20, No. 7, Apr. 1, 2020 (Year: 2020).*

Google Machine Translation of DE102018129777A1 (2017) (Year: 2017).*

* cited by examiner

VEHICLE HAVING USER INPUTS CONTROLLED BASED ON MONITORED PET LOCATION

FIELD OF THE DISCLOSURE

The present disclosure generally relates to transport vehicles, and more particularly relates to a vehicle that monitors a pet in the vehicle and controls one or more user input functions.

BACKGROUND OF THE DISCLOSURE

Automotive vehicles are commonly used to transport pets such as dogs, cats and other animals. When traveling in a vehicle, pets may often travel without cages or other restraint devices, such that the pet generally may move about the passenger compartment of the cabin interior. In doing so, pets may inadvertently contact one or more user inputs. It may be desirable to provide for enhanced controls of user inputs to avoid unwanted activations of the user input controls.

SUMMARY OF THE DISCLOSURE

According to a first aspect of the present disclosure, a vehicle is provided. The vehicle includes one or more user inputs, a monitoring system for detecting and monitoring a pet within the vehicle, and a controller processing an output generated by the monitoring system and determining a location of the pet based on the output, the controller further controlling activation of the one or more user inputs based on the determined location of the pet to control an operating mode of one or more of the one or more user inputs when the pet is detected proximate to the one or more user inputs.

Embodiments of the first aspect of the disclosure can include any one or a combination of the following features:
- the controller disables a function associated with the one or more inputs and assigns the function to one or more input devices located at a different location in the vehicle;
- the function is reassigned to a touch screen display;
- the one or more user inputs operate as single push actuation inputs, and wherein the controller changes the operation of the one or more inputs to double push actuation inputs when a pet is located proximate to the one or more user inputs;
- the monitoring system comprises one or more imaging devices for capturing images of the pet within the vehicle, wherein the controller processes the captured images to determine the presence of the pet and the location of the pet within the vehicle;
- the monitoring system comprises a plurality of first RF signal communication devices located at a plurality of locations on the vehicle, and a second RF signal communication device configured to be located on a pet for transmitting an RF signal, wherein the controller processes the RF signal received by each of the plurality of first RF signal communication devices and determines the location of the pet based on the received signal from each of the plurality of RF signal receivers;
- the second RF signal communication device is located on a wearable device of the pet;
- a vehicle body defining a cabin interior, wherein the one or more user inputs are located within the cabin interior;
- the user inputs are located proximate to a driver seat of the vehicle; and
- the one or more user inputs are located on or near a center console adjacent to the driver seat.

According to a second aspect of the present disclosure, a vehicle is provided. The vehicle includes a vehicle body defining a cabin interior, a driver seat within the cabin interior, user inputs located in the cabin interior of the vehicle and proximate to the driver seat, a monitoring system for detecting and monitoring a pet within the vehicle, and a controller processing an output generated by the monitoring system and determining a location of the pet based on the output, the controller further controlling activation of the user inputs based on the determined location of the pet to disable an operating mode of one or more of the user inputs when the pet is detected proximate to the user inputs.

Embodiments of the second aspect of the disclosure can include any one or a combination of the following features:
- the controller disables a function associated with the user inputs and assigns the function to one or more input devices located at a different location in the vehicle;
- the function is reassigned to a touch screen display;
- the user inputs operate as single push actuation inputs, and wherein the controller changes the operation of the user inputs to double push actuation inputs when a pet is located proximate to the user inputs;
- the monitoring system comprises one or more imaging devices for capturing images of the pet within the vehicle, wherein the controller processes the captured images to determine the presence of the pet and the location of the pet within the vehicle;
- the monitoring system comprises a plurality of first RF signal communication devices located at a plurality of locations on the vehicle, and a second RF signal communication device configured to be located on a pet for transmitting an RF signal, wherein the controller processes the RF signal received by each of the plurality of first RF signal communication devices and determines the location of the pet based on the received signal from each of the plurality of RF signal receivers; and
- the user inputs are located on or proximate to a center console adjacent to the driver seat.

According to a third aspect of the present disclosure, a method of controlling user inputs in a vehicle is provided. The method includes the steps of detecting a presence of a pet within a vehicle, determining a location of the pet within the vehicle, and controlling functionality of one or more user inputs when the pet is determined to be located proximate to the one or more user inputs.

Embodiments of the third aspect of the disclosure can include any one or a combination of the following features:
- the step of controlling comprises disabling the one or more user inputs, and reassigning functionality of the disabled one or more user inputs to one or more input devices located at a different location in the vehicle; and
- the step of controlling comprises changing operation of the disabled one or more user inputs from single actuation inputs to double actuation inputs.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
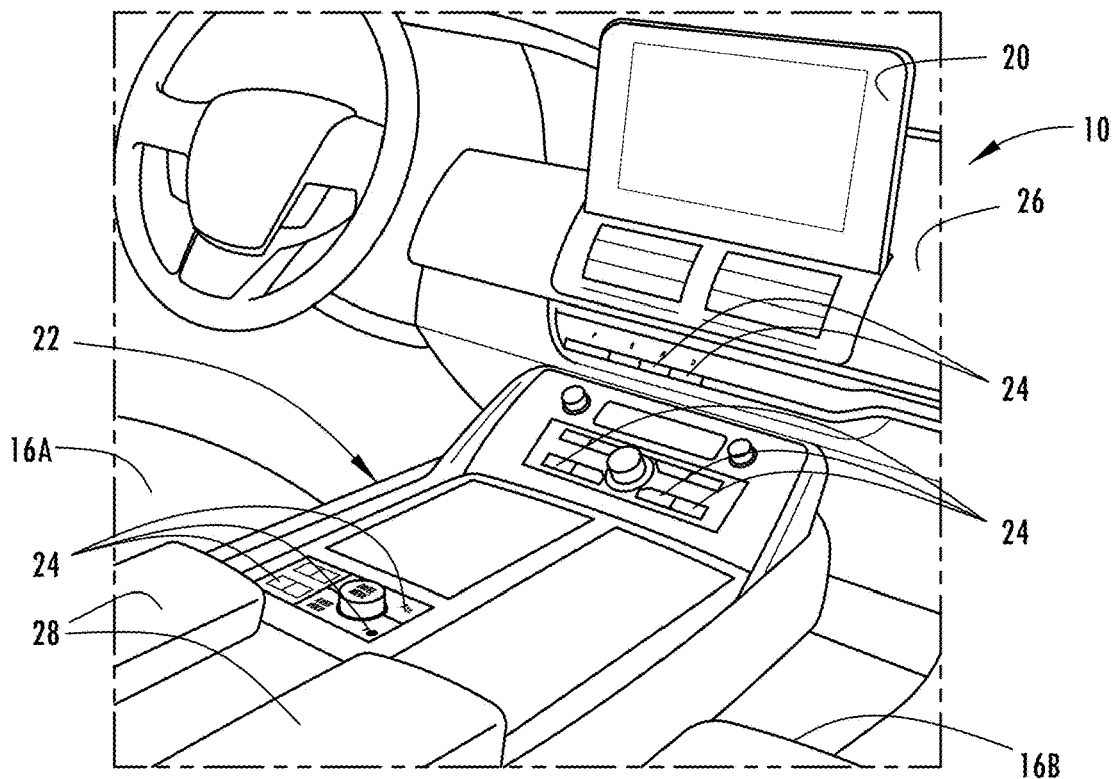
FIG. 1 is a side perspective view of a portion of a cabin interior of a vehicle containing a center console and user input controls proximate thereto, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to pet detection and control of user inputs in a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-4, the cabin interior 14 of a wheeled automotive or motor vehicle 10 is generally illustrated configured with passenger seating and accommodations for transporting living beings such as people and pets. The cabin interior 14 is generally defined by a vehicle body 12 and may contain various features and trim components within the vehicle body 12. The cabin interior 14 is shown having an arrangement of passenger seats including a first or front row of driver and passenger seats 16A and 16B and a second or rear row of three seats 16C-16E shown as bench or split bench seating. The vehicle 10 may also possess additional rows of seating as in the case of a typical large SUV, van or bus. The vehicle body 12 further defines a floor 18 upon which the seating is assembled. It should be appreciated that the vehicle 10 may be a motor vehicle, such as a wheeled car, truck, SUV, van or bus, for example, or an airplane, train, boat or other vehicle capable of transporting people and pets.

Figure 2:
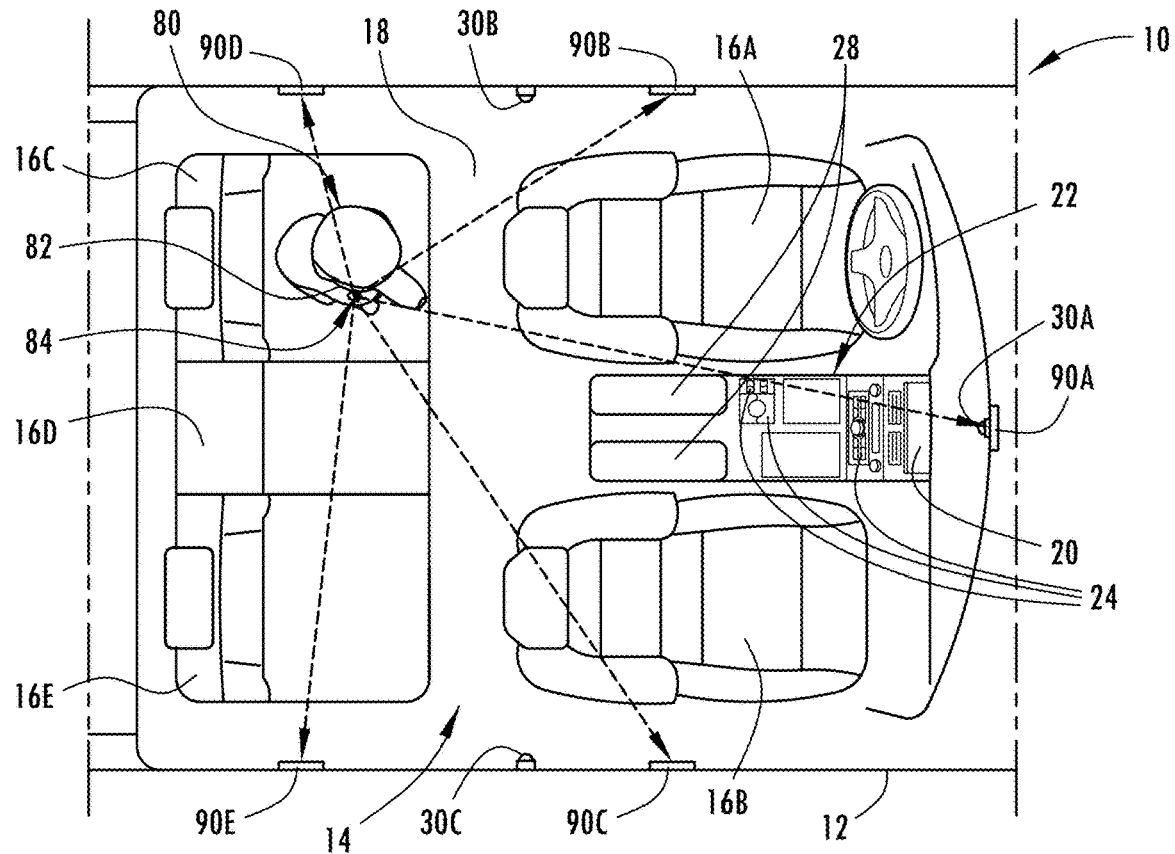
FIG. 2 is a top view of the cabin interior of the vehicle containing a pet at a first location within the cabin interior and RF signal communication devices and imaging devices for monitoring the pet.

The vehicle 10 is further shown containing a pet 80, such as a dog, shown in FIG. 2 sitting on one of the rear seats 16C for travel as a passenger within the cabin interior 14 of the vehicle 10. It should be appreciated that the vehicle 10 may transport any of a number of living beings, including one or more persons and one or more pets such as dogs and cats, for example. The pet 80 is shown wearing a wearable device in the form of a collar 82 which is equipped with a radio frequency (RF) signal communication devices such as an RF signal transmitter 84. It should be appreciated that the pet 80 may be positioned at any of a number of locations within the cabin interior 14 of the vehicle 10 and may move about the cabin interior 14 if un." ed. Depending on the location of the pet 80 within the cabin interior 14 functions related to one or more user inputs may be controlled as disclosed herein.

The vehicle 10 is equipped with a center console 22 shown located between the front row driver seat 16A and passenger seat 16B. Located on a forward portion of the center console 22 are a plurality of user inputs 24. The user inputs 24 may be configured as mechanical pushbutton switches that are depressionable when pressed with a press touch and typically have a return spring bias, according to one example. The user inputs 24 may be configured as proximity switches, such as capacitive switches, according to another example. The user inputs 24 are each configured to generate a signal to perform a function related to the vehicle 10. For example, the user inputs 24 may be configured as pushbutton switches to provide an input signal to select the transmission gear position, such as park, reverse, neutral, drive, low (PRNDL). Additionally, vehicle user inputs 24 may be configured as pushbutton switches to provide input signals for selecting vehicle driving modes, such as two wheel drive mode, all-wheel drive mode, four wheel drive mode, off road driving mode, towing mode and various other vehicle driving modes. Further, the user inputs 24 may be configured as pushbutton switches to provide window controls for controlling window motors to actuate the windows between the open and closed position, lights to activate lights within the vehicle, heating, ventilation and cooling (HVAC) controls such as to control temperature, heating or air conditioning modes, fan speed, and other HVAC related controls, and entertainment or infotainment functions, such as radio and other media functions.

The vehicle 10 may be equipped with various user inputs 24 located on the upper forward portion of the center console 22. As seen in FIG. 1, drive mode functions may be controlled with the user inputs 24 located just forward of the armrest 28. User inputs 24 are also located on an upper portion of the forwardmost portion of the center console 22 which may include radio and/or HVAC controls, according to one example. Additionally, user inputs 24 may be located on a dashboard 26 of the vehicle 10 and may be configured as vehicle transmission controls, such as PRNDL. Such user inputs 24 may be located on a lower portion of the dash. It should be appreciated that the user inputs 24 are generally located in a position to be accessible by a vehicle driver and/or passenger. As such, one or more of the user inputs 24 may also be accessible for inadvertent contact by a pet.

As a result of the location of the user input, the user inputs 24 may inadvertently be actuated by a pet that moves about the cabin interior 14. To avoid unwanted activations of the user inputs 24, the vehicle 10 monitors a location and movement of a pet within the cabin interior 14 and controls the user inputs 24 to disable at least some functions when a pet 80 is determined to be located proximate to the user inputs 24. The input controls 24 may be disabled from their current operating mode. This may include completely disabling the user inputs 24 that are located near the pet and are at risk of being inadvertently activated or changing the operating mode of the user inputs 24 from a single press mode to a double press mode where multiple activations of the same user inputs within a time period such as one second is required to activate the input. Further, the vehicle 10 may reassign the functionality of the user inputs 24 to other user inputs in the vehicle, such as to a touch screen display 20 while the pet is determined to be located proximate to the user inputs 24. As a result, the functionality of the user inputs 24 may be provided elsewhere on the vehicle 10 at a location away from the pet.

Figure 3:
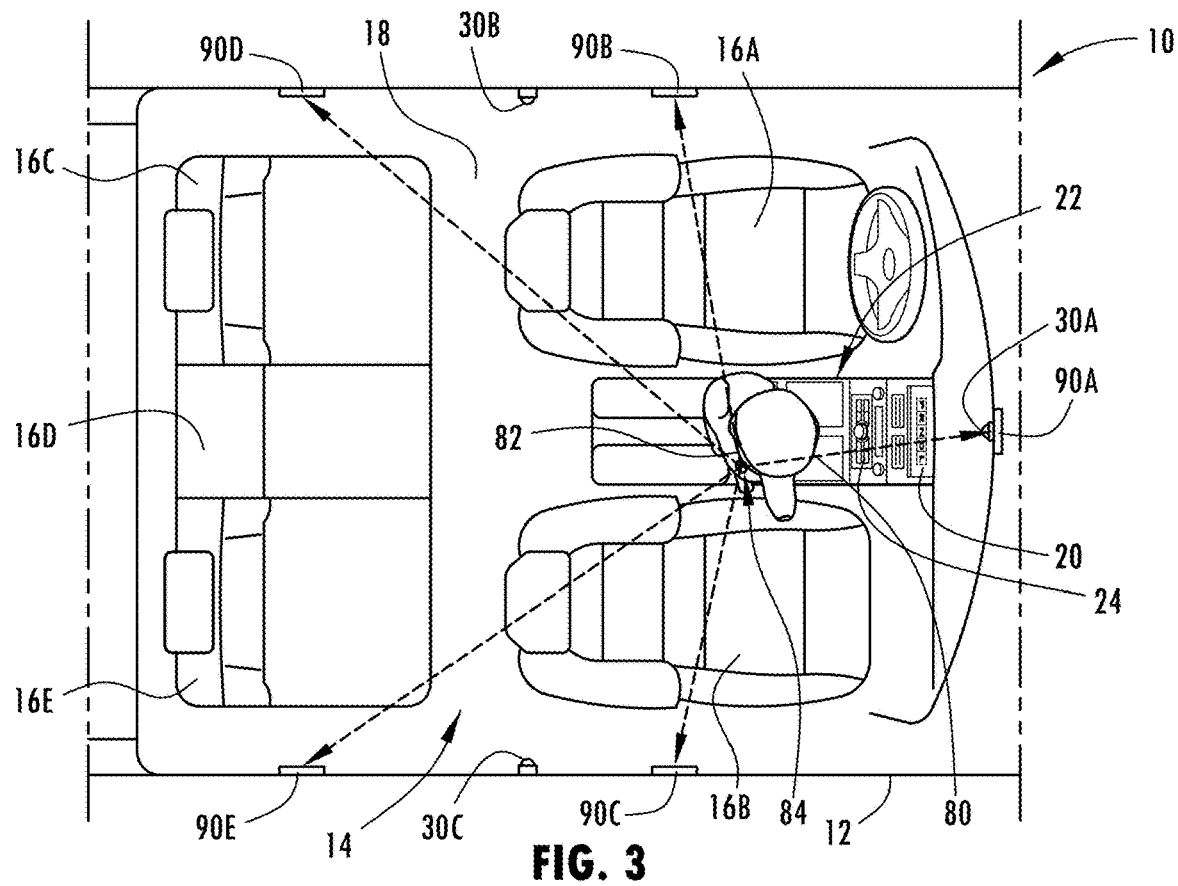
FIG. 3 is a top view of the cabin interior of the vehicle containing the pet located at a second position proximate the center console and the user input controls, according to one example.
Figure 4:
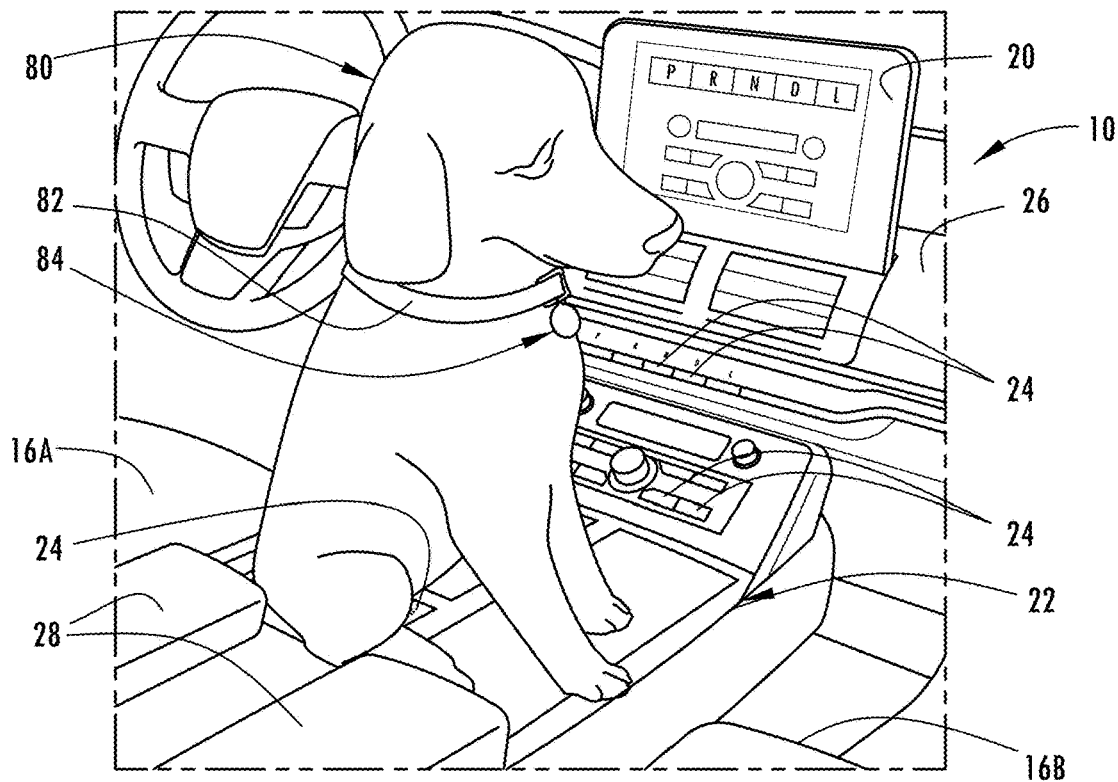
FIG. 4 is a side perspective view of the portion of the cabin interior containing the center console and input controls with the pet located thereon.

In order to determine the location of the pet 80 within the cabin interior 14, the vehicle may monitor for the presence and determine the location of the pet 80 using one or more imaging devices, such as cameras and/or monitoring radio frequency (RF) signals associated with an RF signal communication device such as an RF signal transmitter located on the pet. The vehicle 10 is equipped with one or more imaging devices, which may include three imaging devices 30A-30C located at various locations within the cabin interior 14 to capture images of the cabin interior 14. The imaging devices 30A-30C may include cameras that capture images of the cabin interior 14. It should be appreciated that cabin interior 14 may be equipped with one or more imaging devices. The imaging devices 30A-30C may compare known images of pets with images captured by one or more of the imaging devices 30A-30C within the cabin interior 14 and determine the presence of one or more pets 80 within the cabin interior 14. This may be accomplished by using image processing looking for features in the captured images associated with a pet, such as a dog. By monitoring the images captured with the imaging devices 30A-30C, the presence and movement of a pet 80 within the cabin interior 14 may be detected. For example, a pet 80 may be detected on a rear seat, such as seat 16C as shown in FIG. 2, and its movement to a position on top of or proximate to the center console 22 and user inputs 24, as shown in FIGS. 3 and 4, may be detected. In the position shown in FIGS. 3 and 4, the presence of a pet 80 located on top of the center console 22 and proximate the user inputs 24 may be used to control the user inputs 24 to disable at least functionality of one or more of the user inputs 24 based on the detected location of the pet 80.

As seen in FIGS. 2 and 3, the vehicle 10 is configured to include a plurality of first RF signal communication devices shown and described in one embodiment as a plurality of RF receivers 90A-90E positioned at different locations on board the vehicle 10. In the example shown, the vehicle 10 is equipped with five (5) RF receivers 90A-90E, however, it should be appreciated that any number of RF receivers may be employed. The RF receivers 90A-90E each may receive RF signals transmitted by one or more RF transmitters including the RF transmitter 84 located on the collar 82 of the pet 80. The RF receivers 90A-90E may be configured as RF transceivers which may allow for the transmission and reception of RF signals. As such, RF transceivers may receive the RF transmit signals from the RF transmitter 84 and may further transmit signals to other communication devices on-board or off-board the vehicle 10.

The RF transmitter 84 may be configured as an RF transceiver that both transmits and receives RF signals. The RF transmitter 84 may use Bluetooth® low energy (BLE) commonly operating in 2.4 GHz ISM band (Industrial Scientific and Medical) and used for wireless personal area networks, according to one example. According to another example, the RF transmitter 84 may use an Ultra Wide-Band (UWB) protocol which may operate in the 6-8 GHz band. With both BLE or UWB, the system may employ the use of Round-Trip Time (RTT) Time of Flight (ToF) to establish the pet collar location through triangulation or other methods such as Angle-of-Arrival (AoA), Received Signal Strength Indication (RSSI), Phase or other methods. Further, other technologies may be used such as low frequency (i.e., 125-134 kHz) RSSI or acoustic or ultrasonic sound.

As seen in FIGS. 2-4, a second RF signal communication device embodied as an RF transmitter 84 is located on the collar 82 worn on the pet 80 and transmits a low energy RF signal that may be received by each of the five RF receivers 90A-90E. RF receiver 90A is shown located at a position generally at the forward end of the cabin interior 14, RF receivers 90B and 90C are shown located on opposite left and right lateral sides of the front row of seating, and RF receivers 90D and 90E are shown located on opposite left and right lateral sides of the second row of seating. As such, each of the RF receivers 90A-90E is located in a different location separated from the other RF receivers 90A-90E. The RF signal transmitted from the RF transmitter 84 is received by each of the RF receivers 90A-90E and is processed to determine a location of the pet 80. According to one embodiment, this may be achieved by processing the received signal strength or amplitude of the RF signal received at each of the RF receivers 90A-90E and determining via triangulation a geographic location of the pet 80. By determining the amplitude of the RF signal received by each RF receivers 90A-90E, the distance from each RF receiver to the RF transmitter can be determined. Given the relative location to each RF receiver, the location of the RF transmitter transmitting the processed signal can be determined using triangulation.

Figure 5:
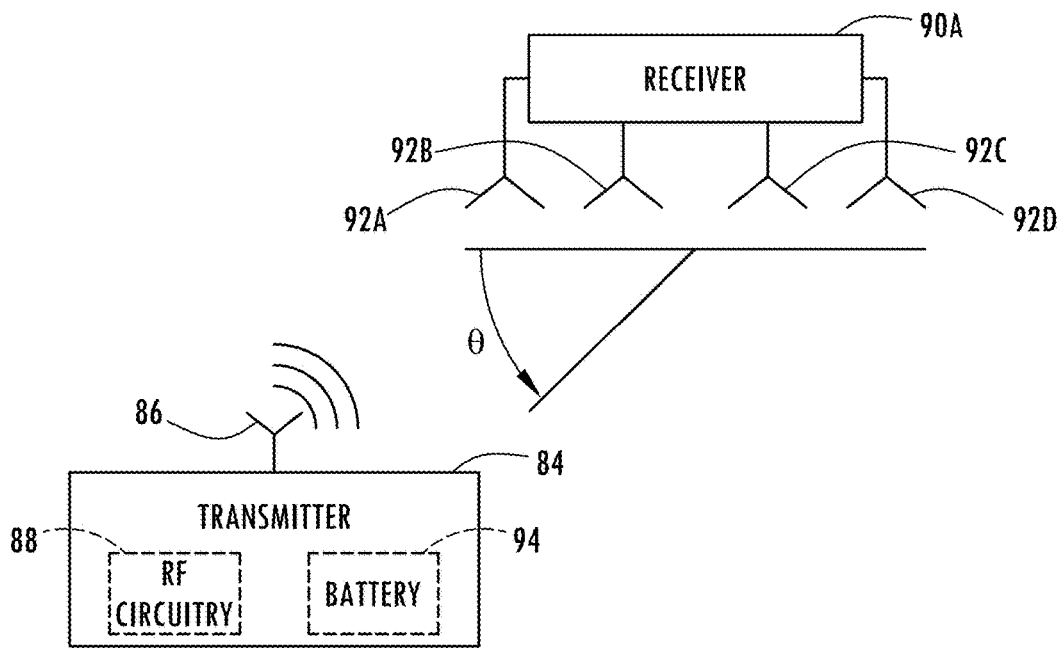
FIG. 5 is a schematic view of an RF signal transmitter communicating with an RF signal receiver to track location of the RF signal transmitter, according to one example.

According to another embodiment, the RF receivers 90A-90E may include a plurality of antennas that further enable determination of an approximate angle θ of arrival as shown in FIG. 5 to provide enhanced accuracy determination to the location of the RF transmitter 84 associated with the pet 80. In this embodiment, RF receiver 90A is shown having a plurality of antennas, shown as four antennas 92A-92D for receiving an RF signal transmit from the RF transmitter 84 with antenna 86 and determining an angle θ of arrival of the signal based on the arrangement of the plurality of antennas 92A-92D. The amplitude of the signal received at each of the RF receivers 90A-90E may further be processed to determine distance to each RF receivers and to determine an accurate position of the RF transmitter by using triangulation. RF receivers 90A-90E may likewise be configured as shown in FIG. 5. According to a further embodiment, the location of the RF transmitter may be determined based on a determined roundtrip time of flight.

As such, the pet 80 may be monitored and the location of the RF transmitter 84 on the pet 80 determined by processing the RF signal received with the RF receivers 90A-90E with a controller. The driver and passengers in the vehicle 10 may be notified of the location of the pet 80 on a human machine interface (HMI), such as a vehicle display screen 20. The determined location of the pet 80 may be used to control various functions on board the vehicle 10 such as disabling the at risk user inputs 24 in the vicinity of the pet 80 or requiring then to see a double-push before processing the command associated with the switch.

The RF transmitter 84 may include an antenna 86, RF circuitry 88, and an electrical power source in the form of a battery 94. The vehicle 10 may provide a low battery output signal to indicate when the pet collar battery 94 is running low so that the battery may be replaced. Alternatively, the first RF signal communication devices may be configured as transceivers that may be used as power sources from which a battery-less transceiver on the pet collar 82 can harvest energy and then act as a transponder thus ensuring the pet monitoring system may operate without a battery. This may be achieved by harvesting energy from the RF signal received by the antenna with a blocking diode that charges one or more capacitors. While the RF transmitter 84 is shown located on the pet collar 82, it should be appreciated that the RF transmitter 84 may be located elsewhere on the pet 80 or an accessory associated with the pet 80 to provide a signal used to identify the location of the pet 80.

The RF transmitter 84 may be configured to only transmit when located in a vehicle or to transmit at a higher transmission rate when in a vehicle, so as to consume less battery power. The RF transmitter 84 can remain in a dormant state and can be prompted to an active state by the vehicle system or may transmit signals only on request so as to further conserve the battery power. For example, with the RF transmitter 84 configured as an RF transceiver, the RF transceiver may receive a signal prompting the RF transmitter portion of the transceiver to transmit signals upon request and may otherwise remain in the dormant state to thereby conserve battery power.

While the second RF signal communication device in the form of the RF transmitter 84 is shown located on a pet collar 82 and the first RF signal communication devices in the form of the RF receivers 90A-90E are located on the vehicle 10, it should be appreciated that the RF transmitter 84 may be configured as an RF transceiver that may be located on either the pet collar 82 or the vehicle 10 and the plurality of RF receivers 90A-90E may be located on the other of the pet collar 82 and the vehicle 10, according to further embodiments.

Figure 6:
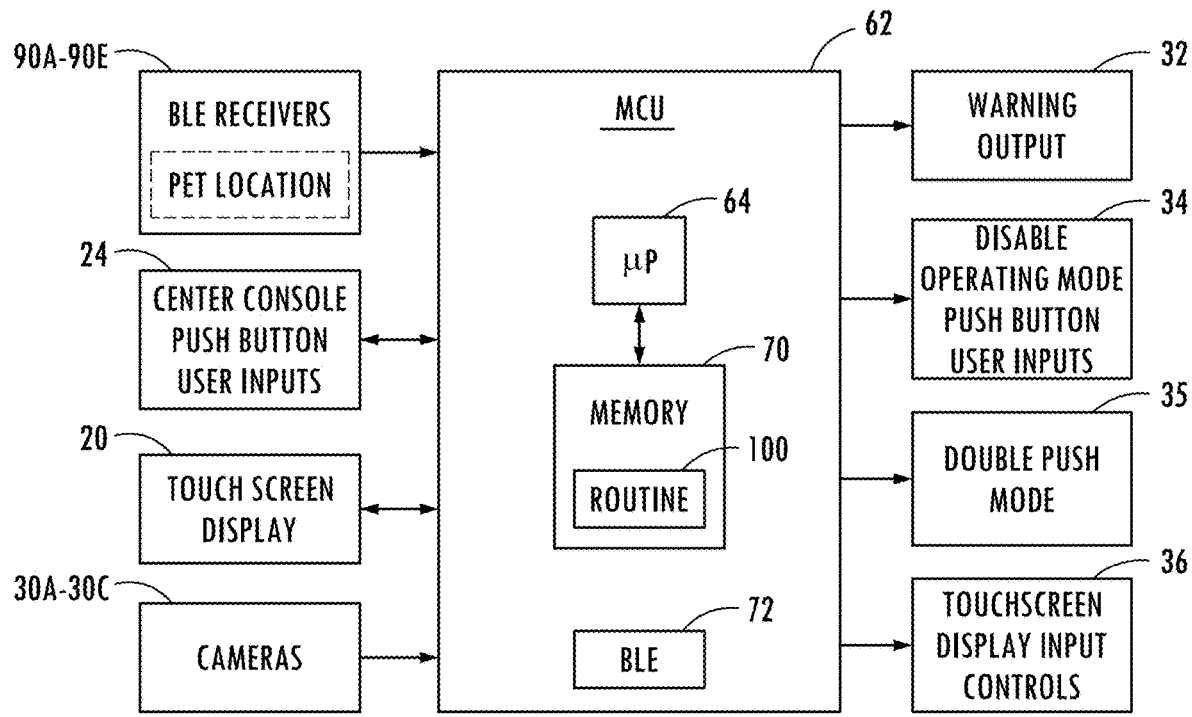
FIG. 6 is a block diagram illustrating a controller configured for controlling user input functions based on the monitored pet.

Referring to FIG. 6, a controller 62 is shown for receiving various inputs and controlling various outputs depending upon the sensed location of the pet 80. The controller 62 is shown configured as a microcontrol unit (MCU) having a microprocessor 64 and memory 70. It should be appreciated that any analog and/or digital control circuitry may be employed as the controller 62. Stored within memory 70 and executed by microprocessor 64 are one or more control routines 100. Additionally, the controller 62 is shown having a wireless communication device 72, such as a Bluetooth® low energy device (BLE). The controller 62 receives various inputs made available on the vehicle 10 including received RF signals from the BLE receivers 90A-90E which may be processed to determine the location of the pet by communicating via the RF transmitter 84 using signal triangulation. Further the controller 62 receives video images captured from the imaging devices 30A-30C, such as cameras, located within the cabin interior. The controller 62 may process the captured images to detect the presence and determine the location and movement of one or more pets within the cabin interior. It should be appreciated that the controller 62 may determine the presence and location of the pet using one or both of the RF signals received with the RF receivers 90A-90E and the processed images received with one or more of the imaging devices 30A-30C.

The controller 62 further receives the center console push button user inputs 24 and communicates with the touch screen display 20. The controller 62 determines a presence and location of a pet within the vehicle cabin interior. If the pet is determined to be located in close proximity to one or more of the center console push button user inputs 24, the controller 62 disables at least some of the functionality of the user inputs that may be at risk of inadvertent actuation by the pet. The controller 62 may completely disable the functionality of one or more of the user inputs 24 and may reassign the functionality to other user input devices, such as the touch screen display 20. In doing so, the touch screen display 20 may display icons on the touch screen indicative of the user inputs 24 which enables a user to touch activate the icons to perform the functionality assigned to those user inputs. The controller 62 may also or alternatively change the functionality of the user inputs from a single push mode to a double push mode whereby the user inputs require multiple activations within a time period, such as one second, to input a signal to perform the designated functionality.

The controller 62 is shown providing a warning output signal 32 which may include warning the driver of the vehicle that a pet has been detected in close proximity to one or more of the user inputs. In addition, the controller 62 may provide a disable operating mode push button user input signal 34 to disable at risk inputs. Further, the controller 62 may provide touch screen display input control signals 36 to display the reassigned inputs on the touchscreen.

Figure 7:
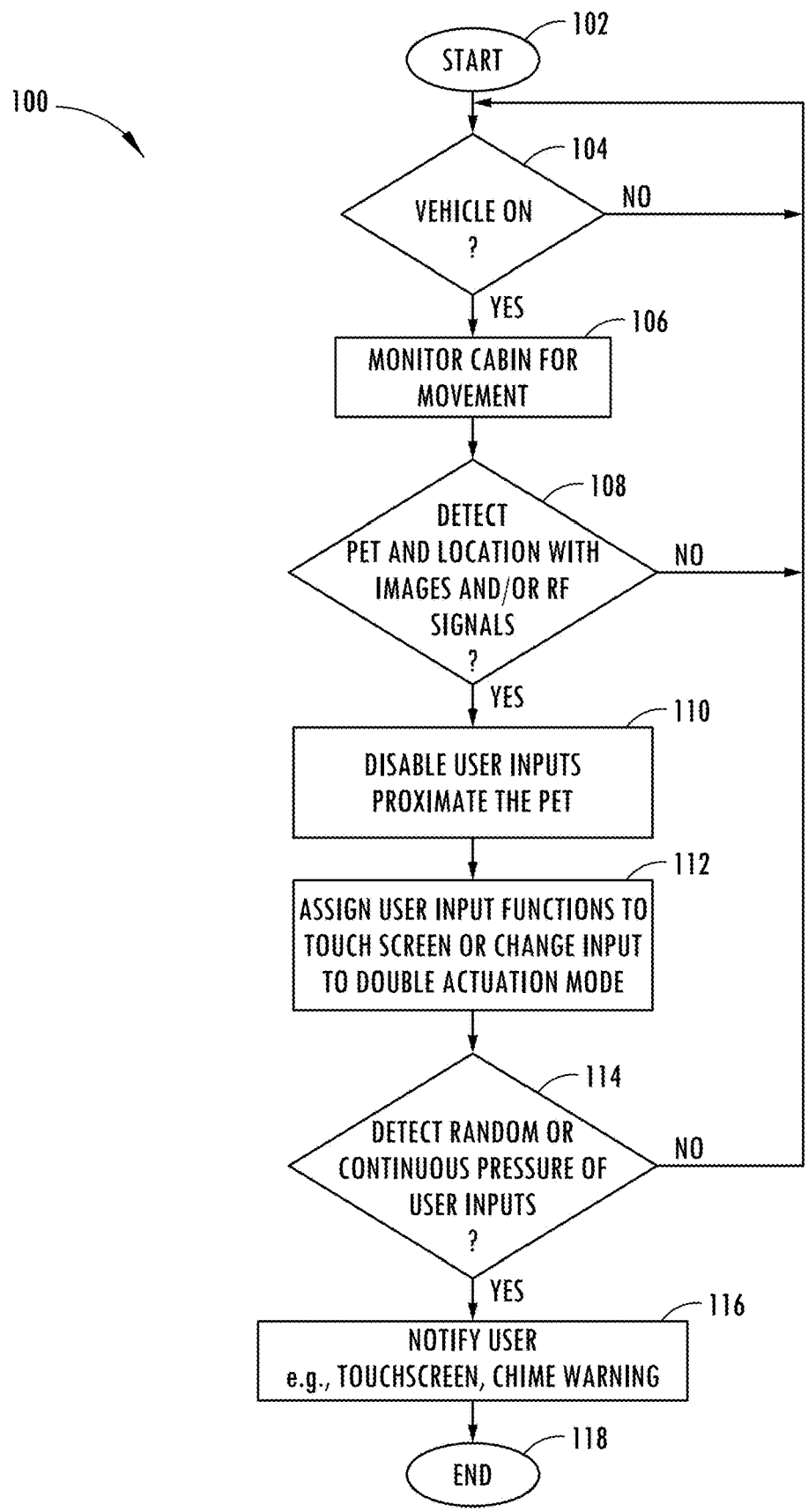
FIG. 7 is a flow diagram illustrating a control routine for controlling user inputs based on the monitored pet.

The routine 100, which is executed by the controller 62, is shown in FIG. 7, according to one example. Routine 100 begins with step 102 and proceeds to decision step 104 to determine if the vehicle is turned on and, if not, returns to start. When the vehicle is turned on and the engine running, the user inputs may be actuated to perform a function. If the vehicle ignition is turned off, some user inputs such as console controls, window controls, etc. may still operate while the vehicle remains in a delayed accessory mode that can last for a defined time period following turning the vehicle off or opening a front door of the vehicle. Some user inputs may also work beyond the delayed accessory time period, such as radio controls, provided the vehicle battery has sufficient power. If the vehicle is determined to be turned on, routine 100 proceeds to step 106 to monitor the cabin interior for movement, such as a person or pet moving within the cabin interior. Next, decision step 108, routine 100 determines if a pet has been detected and to determine the location of the pet by using the one or more imaging devices and/or RF signals. If a pet and its location have not been detected, routine 100 returns to step 104. If a pet and its location have been determined, routine 100 proceeds to step 110 to disable user inputs proximate to the pet that may be at risk of inadvertent contact by the pet. This may include reassigning the user input functions to the touch screen or changing the input operating mode from a single to a double actuation mode in step 112.

Next, routine 100 proceeds to step 114 to detect random or continuous pressure of user inputs and, if none is detected, returns to step 104. If random or continuous pressure of user inputs is detected, routine 100 proceeds to step 116 to notify the user, such as the driver, via touch screen, chime, or other warning of the inadvertent activation before ending at step 118.

Accordingly, the vehicle 10 advantageously provides for monitoring of the location of the pet 80 within a vehicle and controls the functionality related to user inputs 24 based on the determined pet location. This prevents inadvertent activation of the user inputs 24 by the pet 80.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   one or more user inputs;
   a vehicle body defining a cabin interior, wherein the one or more user inputs are located within the cabin interior;
   a monitoring system for detecting and monitoring a presence and movement of a pet within the vehicle; and
   a controller processing an output generated by the monitoring system and determining a location of the pet from a plurality of possible locations within the vehicle based on the output, the controller further controlling activation of the one or more user inputs based on the determined location of the pet to control an operating mode of one or more of the one or more user inputs when the pet is detected proximate to the one or more user inputs.

2. The vehicle of claim 1, wherein the controller disables a function associated with the one or more inputs and assigns the function to one or more input devices located at a different location in the vehicle.

3. The vehicle of claim 2, wherein the function is reassigned to a touch screen display.

4. The vehicle of claim 1, wherein the one or more user inputs operate as single push actuation inputs, and wherein the controller changes the operation of the one or more inputs to double push actuation inputs when a pet is located proximate to the one or more user inputs.

5. The vehicle of claim 1, wherein the monitoring system comprises one or more imaging devices for capturing images of the pet within the vehicle, wherein the controller processes the captured images to determine the presence of the pet and the location of the pet within the vehicle.

6. The vehicle of claim 1, wherein the monitoring system comprises:
   a plurality of first RF signal communication devices located at a plurality of locations on the vehicle; and
   a second RF signal communication device configured to be located on a pet for transmitting an RF signal, wherein the controller processes the RF signal received by each of the plurality of first RF signal communication devices and determines the location of the pet based on the received signal from each of the plurality of RF signal receivers.

7. The vehicle of claim 6, wherein the second RF signal communication device is located on a wearable device of the pet.

8. The vehicle of claim 1, wherein the user inputs are located proximate to a driver seat of the vehicle.

9. The vehicle of claim 8, wherein the one or more user inputs are located on or near a center console adjacent to the driver seat.

10. A vehicle comprising:
    a vehicle body defining a cabin interior;
    a driver seat within the cabin interior;
    user inputs located in the cabin interior of the vehicle and proximate to the driver seat;
    a monitoring system for detecting and monitoring a presence and movement of a pet within the vehicle; and a controller processing an output generated by the monitoring system and determining a location of the pet from a plurality of possible locations within the vehicle based on the output, the controller further controlling activation of the user inputs based on the determined location of the pet to disable an operating mode of one or more of the user inputs when the pet is detected proximate to the user inputs.

11. The vehicle of claim 10, wherein the controller disables a function associated with the user inputs and assigns the function to one or more input devices located at a different location in the vehicle.

12. The vehicle of claim 11, wherein the function is reassigned to a touch screen display.

13. The vehicle of claim 10, wherein the user inputs operate as single push actuation inputs, and wherein the controller changes the operation of the user inputs to double push actuation inputs when a pet is located proximate to the user inputs.

14. The vehicle of claim 10, wherein the monitoring system comprises one or more imaging devices for capturing images of the pet within the vehicle, wherein the controller processes the captured images to determine the presence of the pet and the location of the pet within the vehicle.

15. The vehicle of claim 10, wherein the monitoring system comprises:
a plurality of first RF signal communication devices located at a plurality of locations on the vehicle; and
a second RF signal communication device configured to be located on a pet for transmitting an RF signal, wherein the controller processes the RF signal received by each of the plurality of first RF signal communication devices and determines the location of the pet based on the received signal from each of the plurality of RF signal receivers.

16. The vehicle of claim 10, wherein the user inputs are located on or proximate to a center console adjacent to the driver seat.

17. A method of controlling user inputs in a vehicle, comprising:
detecting a presence and movement of a pet within a cabin interior of the vehicle;
determining a location of the pet from a plurality of possible locations within the cabin interior of the vehicle; and
controlling functionality of one or more user inputs located within the cabin interior when the pet is determined to be located proximate to the one or more user inputs.

18. The method of claim 17, wherein the step of controlling comprises:
disabling the one or more user inputs; and
reassigning functionality of the disabled one or more user inputs to one or more input devices located at a different location in the vehicle.

19. The method of claim 17, wherein the step of controlling comprises changing operation of the disabled one or more user inputs from single actuation inputs to double actuation inputs.

* * * * *